UNITED STATES PATENT OFFICE.

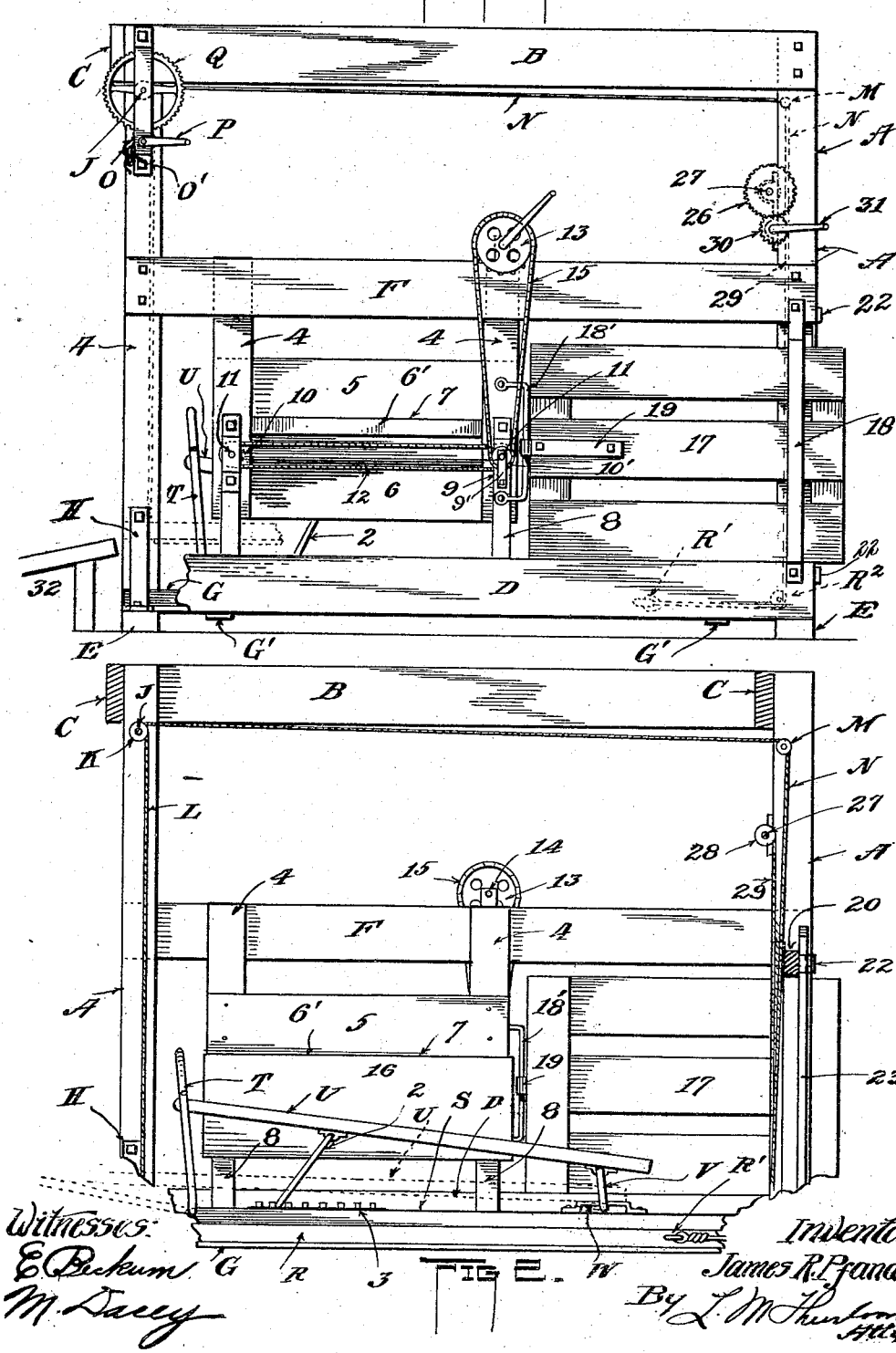

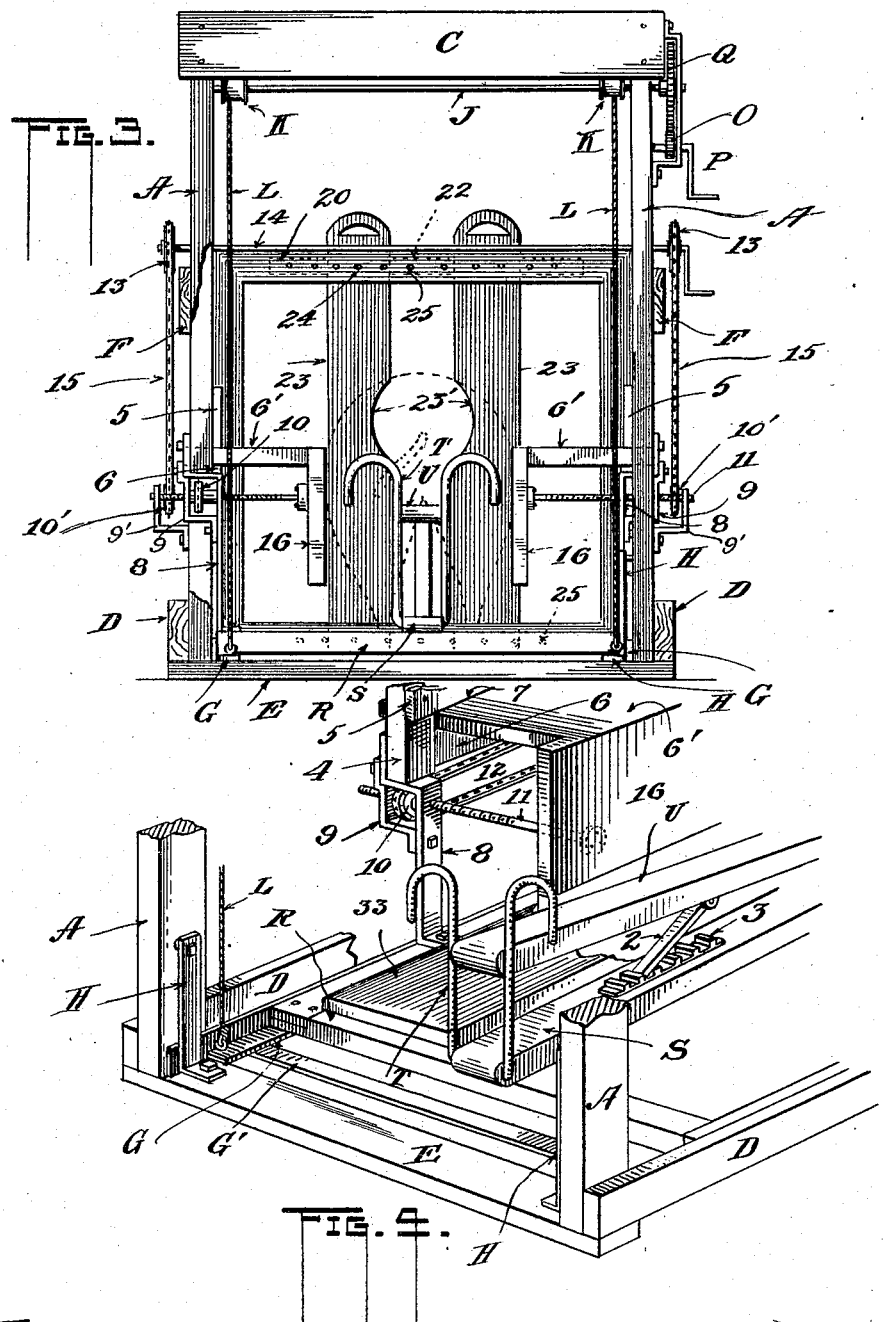

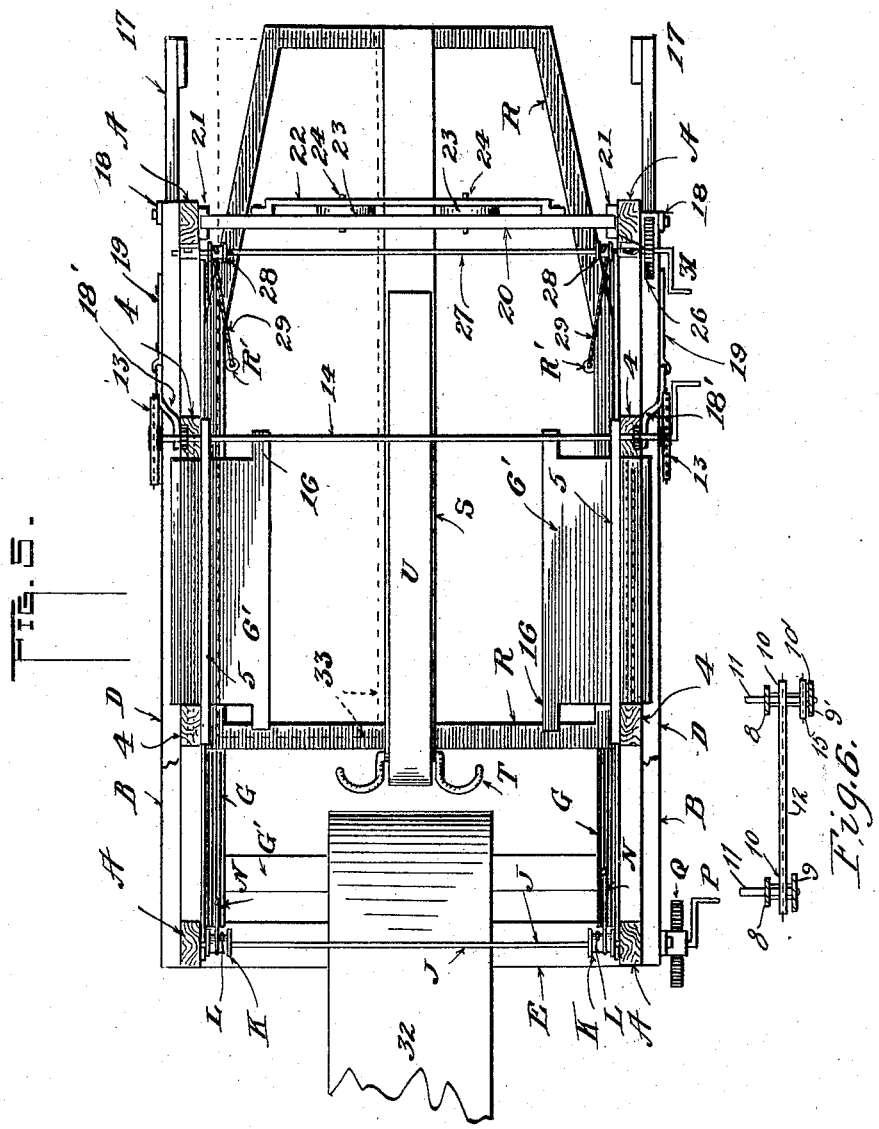

JAMES R. PFANDER, OF PEORIA, ILLINOIS.

BREEDING-CRATE.

1,186,828.  Specification of Letters Patent.  Patented June 13, 1916.

Application filed August 12, 1913. Serial No. 784,412.

*To all whom it may concern:*

Be it known that I, JAMES R. PFANDER, citizen of the United States, residing at Peoria, in the county of Peoria and State of Illinois, have invented certain new and useful Improvements in Breeding-Crates; and I do hereby declare that the following is a full, clear, and exact description of the invention, which will enable others skilled in the art to which it appertains to make and use the same.

This invention relates to improvements to breeding crates particularly adapted for the breeding of swine.

One of the objects of the invention is to simplify the construction and several mechanisms and parts of a breeding crate so that the crate may be produced at a minimum of expense.

Another object is to simplify the construction of a crate of the character described so that its operation will be quite easy and simple.

Still another object is to construct a crate that can be adapted and used for breeding purposes or for trimming the feet of the animals held therein by certain adaptations.

A still further object is to provide a novel and exceedingly simple and effective mechanism for moving certain wings or side-boards with respect to one another in parallel planes.

A further object is to arrange certain tread-boards in connection with the wings or side-boards and operated by the same.

Another object is to provide a certain novel arrangement of adjustment of a member upon which to support the animal and include a bodily raising of the floor of the crate to any desired height.

Other objects and advantages will appear herein aided by the accompanying drawings in which, Figure 1 is a side elevation of the crate. Fig. 2 is a longitudinal sectional elevation of the same. Fig. 3 is an end elevation of the crate. Fig. 4 shows, in perspective, certain structures and details, Fig. 5 is a plan of the crate and Fig. 6 is a plan of a portion of certain operating parts.

The frame of the crate consists of upright corner members A connected at the top by side members B and end members C, and alike connected at the bottom by side members D and end members E, and further connected by side members F midway the height thereof.

G G are two members, preferably angle bars, extending longitudinally of the crate and adapted to rest at their ends upon the end members E, see Fig. 4, the said ends being held behind straps H secured at their upper ends to the uprights A and spaced therefrom to admit the extended limb of said members G, the lower ends of the strap being secured to the members E for example. The angle-bar members G may be secured relative to another in any desired manner, by means of bars G' for example, and are adapted to constitute a raisable support for a platform to be described. Journaled in the top of the crate at one end is a shaft J provided with two spools K, one at each side of said crate, each having a cable L adapted to wind thereon and attached to the member G. At the opposite end of the crate are pulleys M, but one of which is shown, Figs. 2 and 3, and cables N also winding upon the spools extending over the pulleys and down to the opposite ends of the members G. The cables wind upon the spools in the same direction with the result that the platform will be raised or lowered to the same extent at both ends. A pinion O operated by a crank P is in mesh with and operates a large gear Q on the shaft J, considerable lifting power being the result. Resting upon the support made up of the members G, G', is a frame R best shown in Figs. 4 and 5. This frame has a longitudinally disposed member S on one end of which is pivotally mounted a gate consisting in the present instance of a U-shaped rod T adapted to swing, and having a supporting-bar U pivoted at one end between its extensions. The front end of the bar is carried on a bail V pivoted to it and slidably held in a stirrup W secured on said member S.

2 is a pawl pivoted to the bar U and adapted to engage between two teeth of a series of teeth 3 secured on the member S, see Fig. 4, the pawl being adapted to support the bar U at any desired elevation.

4, 4, indicate two pairs of uprights mounted above the frame R at each side, each pair of which is connected by boards or slats 5 and 6, Figs. 1 and 4, between which is left a slit or opening 7. The uprights are each supported upon the frame R by means of a stout metal brace 8, by preference, and each includes a part 9 secured to or formed with it. Between the parts thus associated at each side of the apparatus are sprockets 10 interiorly threaded for receiving thread-bars 11. A sprocket chain 12, Figs. 1, 4 and 6 runs over both sprockets 10 of each pair of thread bars. On one of the thread bars of each pair of thread-bars is a second sprocket 10' each of which receives rotation from a sprocket 13 mounted on a shaft 14 extending across the crate and suitably journaled upon one of the uprights 4 of opposite pairs, through chains 15. As the thread bars 11 that carry the sprockets 10' are movable endwise the same as the others to adjust those ends of the wings 16 to which they are attached, the said sprockets 10' must be held from lateral movement in order to prevent them from moving out of line with the sprockets 13 above them. The sprockets 10 and the sprockets 10' are, therefore a single part or casting outside of which there is provided a bracket 9' similar to the part 9 for the sprockets 10 on the other thread bars, as shown in Fig. 3.

The inner ends of the thread-bars of each pair are suitably secured in a rigid manner to a wing or side board 16 disposed substantially in a vertical plane, both the members being adapted to move in parallel planes and relatively to one another. Extending from the upper portions of each wing is a substantially horizontal shelf-like member 6', termed a foot-rest which extends through and shifts within the slit or opening 7 between the boards 5 and 6 previously mentioned. From the fact that the sprockets 10 turn upon the thread-bars which are affixed to the wings 16; and from the further fact that the sprockets are confined between the parts 8 and 9 the said thread-bars must have longitudinal movement or a movement in the direction of their lengths through said sprockets thereby moving the wings inward or outward depending upon the direction of rotation imparted to the sprockets. One pair of the thread-bars has right hand threads and the other left-hand threads so that the rotation of the shaft 14 in a given direction will impart opposite directions of movement to the wings, or so that they will be moved either toward or away from one another.

17 indicates two inclosing side members resting upon the lower members D previously described. These side-members are adapted to shift upon said members D to occupy two extreme positions one of which is shown in Fig. 1, the retracted position, and the other in its extended position, Fig. 5. A bar 18 is attached to the side members F and D and together with the uprights A form a guide within which the side members 17 shift. The parts 18' are bails, one of which is attached at its extremities to each of the parts 4 and 8, while 19 is a strap secured to each member 17 and inclosing each of the bails and within which each is slidable.

20 indicates the frame of a gate stationed at the exit end of the crate. It is vertically slidable between the cleats 21, Fig. 5, of the corner upright members A. Secured on the horizontal parts of said frame are upper and lower straps 22. Within these is placed a pair of upright boards 23 provided in adjacent edges with notches 23' to receive and for holding the neck of the animal. Said boards are adjustable laterally through pins 24 extending through one of a series of holes 25 in the said horizontal frame-parts and said straps 22. The frame R, the wings 16 and the structure for carrying and for operating them, are adapted to shift as a unit upon and longitudinally of the members G and, in addition, the members 17 likewise are shifted due to their connected relation through the bail 18 and the strap 19. Shifting movement is imparted in one direction through a gear 26 of a shaft 27 provided with spools 28, Fig. 5, upon which cables 29 are adapted to wind, the latter being attached at opposite sides of the frame R at R', for example, after extending beneath pulleys R² indicated in Fig. 1, the gear 26 being operated by means of an engaging pinion 30 and a crank 31.

32 indicates an approach or tread-board which may be stationed in any desired position, i. e. either outside the crate as in Fig. 1 or inside as in Fig. 5, said tread-board having no attachment to the crate; merely resting upon the ground or upon any desired part. When in adjustment to receive the animal to be bred the gate T occupies a reclining position (dotted lines Fig. 2) in order to let the animal enter, the gate made up of the frame 20 and the boards 23 being preferably raised so that to the animal an apparently clear avenue is open. Having gotten the animal into the crate the said gate 20 is immediately dropped, and the gate T raised. After having thus been imprisoned the animal, if shorter than the distance between the gates T and 20, is moved forward by turning the shaft 27. This causes the gate T to press upon the animal's rump and carry her forward until her head is pushed between the boards 23 where it can be held by adjusting said boards toward one another and securing them. If the animal is a small one the frame R which is provided with floor boards 33 upon which the animal stands, and one of which is shown in Fig. 4, and in broken lines in Fig. 5, is raised to the proper height by means of the spools K of the shaft J; the tread board for the boar being placed in proper position if indeed said board is required.

In the vertical adjustment of the platform R and its parts the bails 18 play up and down. The board U is adjustable to any height required and is held at a desired elevation by the pawl 2 so that the animal will be prevented from squatting. In addition, the side boards or wings 16 are adjusted so as to engage the sides of the animal and prevent her moving sidewise.

I desire to direct attention to the structure of the parts of my crate with especial regard to the foot-rests 6' and the board 5. It is observed that the former extends beneath the latter as shown and explained, and there is therefore no danger of the fore feet of the boar slipping through openings such as are sometimes in evidence and whereby the animal's legs are sometimes broken.

The adjustment of the wings and the foot-rests simultaneously makes for simplicity of construction and ease and simplicity of operation as distinguished from some devices which adjust these parts separately. Again, a stronger and more rigid structure results from combining them. The adjustment of the wings by the means described is also advantageous in that the interiorly threaded sprockets working upon thread-bars insure positive movement of the wings in parallelism and both are operated in unison and to the same extent so as to properly position the animal.

It is to be noted that the apparatus is adapted for receiving small or large sows and includes the adjustment of the platform of the crate for small or large boars by elevating the platform upon which the sow stands or by using the raised tread board for the boar and letting the sow stand upon the ground, or upon the platform.

Not only is the crate adaptable for breeding purposes but also for holding hogs while their feet are being trimmed. In accomplishing the latter operation the floor boards may be removed and the feet of the animal can be rested upon the ground and then easily reached and lifted to position for trimming by passing the hands through the openings beneath the boards 6. Since the platform is designed to be raised and the auxiliary side portions are to remain at rest upon the members D the bails 18' on the members 4 permit relative movement of the platform and said auxiliary portions. The latter by remaining stationary will constitute tight inclosures at all times for the crate.

The device is susceptible of various modifications such as would be considered as lying within the intent of the invention and the spirit of the claims, I having described a preferred construction.

I claim—

1. In a breeding crate the combination of an inclosing structure including main side portions, a bottom or platform for the same adapted for movement in a longitudinal direction with respect to said structure, auxiliary side portions movable with the platform in said longitudinal direction, and means to impart vertical movement to the platform independently of said auxiliary side portions.

2. In a breeding crate, the combination of an inclosing structure including main side portions and an end inclosing portion, a platform adapted for movement in a longitudinal direction with respect to said structure, auxiliary side portions movable with the platform in its longitudinal movement, a gate carried by and movable with the platform, and means to impart vertical movement to the platform relatively to said auxiliary side portions.

3. In a breeding crate, the combination of a framing, a structure including side inclosing portions and an end portion, a platform adapted for both a longitudinal and a vertical movement with respect to the framing, and upon which the said side portions are carried, auxiliary side inclosing portions, and parts connecting the said side inclosing portions and the auxiliary side inclosing portions, said parts adapted to permit the vertical movement of the platform with respect to the said auxiliary portions, an inclosing part mounted in the forward end of the framing above the platform, and a gate to inclose an animal at the rear.

4. In a device of the character described, the combination of a structure including side inclosing portions and including end inclosing portions, auxiliary side members comprising two portions adapted for movement longitudinally of the structure, a platform adapted also for longitudinal movement between the inclosing sides of the structure and adapted to move beneath the said end portion, and also adapted for a vertical movement, one of the portions of the auxiliary side members being movable with the platform in its vertical movement, a rod disposed vertically upon one of the portions of said auxiliary member, and a part carried by the other member of the same and engaging said rod.

5. In a breeding crate, the combination of an inclosing structure to receive an animal, a pair of spaced wings or side boards within said structure arranged to leave a runway between them for the animal, a thread bar affixed at one end to the outer side of each wing and adapted to have movement in the direction of their lengths, a separate part having threaded engagement with each of the thread bars, means carried by the structure to hold the several parts from movement except a rotary one, and means to rotate all of the parts in unison to impart substantially the same degree of movement to the wings.

6. In a breeding crate, the combination of an inclosing structure, a platform to carry the animal including side portions movable longitudinally of the inclosing structure and also adapted to move vertically with the platform, wings or side boards disposed opposite and lying parallel to the said side portions, a thread bar engaging each wing, an internally threaded sprocket wheel mounted on each thread bar, means on each side portion to engage and prevent movement of the sprockets along the thread bars, means engaging the sprocket wheels and adapted to rotate them simultaneously in a manner to cause the wings to move in a direction perpendicular to their planes.

7. In a device of the character described, the combination with side portions and end inclosing parts, of a pair of wings or side boards lying between said portions, and a foot-rest extending from each wing or side board in opposite directions beneath one of said portions.

8. In a device of the character described, the combination with vertically disposed side portions and end inclosing parts, of a wing or side board lying substantially parallel to each portion and a foot-rest extending from and fixed relatively to each wing and extending beneath and in close proximity to its respective side portion.

9. In a device of the class described, the combination with vertically disposed side portions and end inclosing parts, of a wing or side-board, a foot-rest carried by and fixed relatively to each wing and extending beneath its respective side portion, and means to adjust the wings with respect to the said portions.

10. In a device of the class described the combination with an inclosure to receive an animal including side inclosing portions and an end inclosing portion for one end, of a platform adapted for longitudinal adjustment within the inclosure and including auxiliary side portions movable with it, a wing or side-board carried from each said auxiliary portion, means carried by each of the latter for adjusting the wings with respect to one another, mechanism to adjust the latter simultaneously in the direction of one another, a foot-rest extending from each wing and fixed relatively thereto and extending beneath said auxiliary portion, means to elevate the platform, and an adjustable gate mounted upon the platform to form a closure for the other end of said inclosure.

11. In a device of the character described, the combination of an inclosing structure, a frame, means mounted on the structure to carry and impart vertical movement to the platform, a pair of wings or side boards mounted on the platform and adapted to move with it, and mechanism supported by the platform and adapted for moving the said wings simultaneously in the direction of one another.

12. In a breeding crate, the combination of a frame structure, a platform therein including side inclosures mounted thereon, an inclosing member at the front of the structure, means to impart movement to the platform in a longitudinal direction, means to raise the said platform, a gate mounted on the platform at the rear end of the platform, the same being adjustable in the direction of the said inclosing member at the front, and a wing or side board supported above the platform at each side of the middle line thereof, each having a shelf extending outward through said side inclosures, and means supported from the platform for adjusting the wings simultaneously in the direction of each other.

13. In a breeding crate, the combination of a frame structure, a platform therein including side inclosures, an inclosing member at the front and rear of the crate to retain the animal, a pair of wings or side boards for locating an animal, each including a shelf portion rigid therewith extending beneath the side inclosures, the lower edge of the latter being substantially flush with the top surface of said shelf portions, and means to adjust the wings in a direction perpendicular to their planes, the said shelf portions being movable with the said wings.

14. In a breeding crate, the combination of a frame structure, a platform therein including side inclosures mounted thereon, an inclosing member at the front of the crate independent of and lying above the platform, a combined rear inclosing member and supporting bar mounted on the platform and adjustable relatively to it, a wing or side board erected at each side of the supporting bar including a shelf rigidly attached to it extending outward beneath the inclosing member, the lower edge of the latter lying close to the upper surface of said shelf, means to adjust the platform in a longitudinal direction, and means to adjust it vertically.

In testimony whereof I affix my signature, in presence of two witnesses.

JAMES R. PFANDER.

Witnesses:
W. I. SLEMMONS,
L. M. THURLOW.